(12) United States Patent
Orofino, II

(10) Patent No.: US 9,170,783 B1
(45) Date of Patent: Oct. 27, 2015

(54) CLASS CREATION ASSISTANT FOR TEXTUAL PROGRAMMING LANGUAGES

(75) Inventor: Donald P. Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 918 days.

(21) Appl. No.: 13/327,263

(22) Filed: Dec. 15, 2011

(51) Int. Cl.
*G06F 9/44* (2006.01)

(52) U.S. Cl.
CPC ........................................ *G06F 8/34* (2013.01)

(58) Field of Classification Search
None
See application file for complete search history.

(56) References Cited

U.S. PATENT DOCUMENTS

| | | | | |
|---|---|---|---|---|
| 5,408,665 | A * | 4/1995 | Fitzgerald | 717/163 |
| 6,025,836 | A * | 2/2000 | McBride | 715/750 |
| 7,464,382 | B1 * | 12/2008 | Kushnirskiy | 719/314 |
| 2003/0005171 | A1* | 1/2003 | Schaeffer | 709/315 |
| 2004/0006765 | A1* | 1/2004 | Goldman | 717/116 |
| 2005/0193392 | A1* | 9/2005 | Carusi et al. | 719/315 |
| 2006/0064178 | A1* | 3/2006 | Butterfield et al. | 700/18 |
| 2007/0043992 | A1* | 2/2007 | Stevenson et al. | 714/732 |
| 2007/0198741 | A1* | 8/2007 | Duffy et al. | 709/245 |
| 2007/0294644 | A1* | 12/2007 | Yost | 715/856 |
| 2008/0092111 | A1* | 4/2008 | Kinnucan et al. | 717/105 |
| 2008/0127064 | A1* | 5/2008 | Orofino et al. | 717/108 |
| 2009/0089262 | A1* | 4/2009 | Cheng et al. | 707/3 |
| 2010/0066643 | A1* | 3/2010 | King et al. | 345/1.3 |
| 2010/0269089 | A1* | 10/2010 | Panicker et al. | 717/105 |
| 2012/0161940 | A1* | 6/2012 | Taylor | 340/10.3 |
| 2012/0240099 | A1* | 9/2012 | Dangeville et al. | 717/105 |
| 2013/0080887 | A1* | 3/2013 | Hou | 715/273 |

OTHER PUBLICATIONS

"DSP System Toolbox™: User's Guide," The MathWorks, Inc., Sep. 2011, pp. i-xiv, 1-1 to 1-96, 2-1 to 2-70, 3-1 to 3-206, 4-1 to 4-64, 5-1 to 5-22, 6-1 to 6-44, 7-1 to 7-10, 8-1 to 8-92, 9-1 to 9-14, 10-1 to 10-38, A-1 to A-4, and Index-1 to Index-11.
"MATLAB® Object-Oriented Programming," The MathWorks, Inc., Sep. 2011, pp. i-xxii, 1-1 to 1-18, 2-1 to 2-48, 3-1 to 3-54, 4-1 to 4-26, 5-1 to 5-30, 6-1 to 6-30, 7-1 to 7-36, 8-1 to 8-20, 9-1 to 9-48, 10-1 to 10-68, 11-1 to 11-26, 12-1 to 12-38, 13-1 to 13-6, 14-1to 14-26, 15-1 to 15-38, 16-1 to 16-20, 17-1 to 17-26, and Index-1.
Template Method Design Pattern,' SourceMaking, <http://sourcemaking.com/design_patterns/template_method>, Retrieved on Jun. 22, 2011, pp. 1-4.

(Continued)

*Primary Examiner* — Don Wong
*Assistant Examiner* — Hossain Morshed
(74) *Attorney, Agent, or Firm* — Cesari and McKenna, LLP; Michael R. Reinemann

(57) ABSTRACT

A program file may include code blocks, such as properties and methods blocks. An assistant module may provide a contextual information tool, a class diagram tool, and a template tool. The assistant module may monitor the location of a user interface element as it is moved about the program file. The assistant may provide information regarding the current location of the user interface element through the contextual information tool. The assistant module also may track the construction of the program, and provide information through the class diagram tool regarding program elements, such as properties and methods, defined so far in the program file. The assistant module may present design information, such as a class construction template, in the template tool, and may dynamically update this information during the creation of the program file.

41 Claims, 13 Drawing Sheets

(56) References Cited

OTHER PUBLICATIONS

Tarr, Bob, "The Template Method Pattern," University of Maryland, Baltimore County, < http://userpages.umbc.edu/~tarr/dp/lectures/Template.pdf >, Spring 2005, pp. 1-14.

Eden, Amnon H., "The 'Gang of Four' Companion," Department of Computer Science, University of Essex, United Kingdom, Dec. 31, 2007, pp. 1-41.

"Does Sublime's 'Minimap' Improve Productivity? [closed]," Programmers Stack Exchange, Stack Exchange , Inc., <http://programmers.stackexchange.com/questions/156362/does-sublimes-minimap-improve-productivity>, Jul. 2012, pp. 1-4.

Kelly, Shauna, "How to Use the Document map in Microsoft Word," Pair Networks, <http://shaunakelly.com/word/numbering/documentmap.html>, Aug. 7, 2010, pp. 1-6.

"Minimap Scroll Behavior Has Some Issues," Sublime Forum, phpBB Group, Part 1 of 2, <https://www.sublimetext.com/forum/viewtopic.php?f=3&t=3414>, Oct. 17, 2011, pp. 1-5.

"Minimap Scroll Behavior Has Some Issues," Sublime Forum, phpBB Group, Part 2 of 2, <https://www.sublimetext.com/forum/viewtopic.php?f=3&t=3414&start=10>, Mar. 5, 2012, pp. 1-5.

"Working With the Navigation Pane in Word 2010," The Productivity Hub, <http://blogs.technet.com/b/hub/archive/2010/09/07/working-with-the-navigation-pane-in-word-2010.aspx>, Sep. 7, 2010, pp. 1-2.

\* cited by examiner

```
Editor
File Edit Text Go Cell Tools Debug Desktop Window Help ─── 602
      ─── 604
 1  classdef OverlapAdd < matlab.system
 2  % Overlap-add  filtering  algorithm.
 3
 4      properties                              606
 5          InputLen   =  256
 6          OverlapLen =  90
 7      end    610
 8
 9      properties  (Access=private)
10          PrevSamples % cache last N-L samples on each iteration
11      end
12
13      methods  (Access=protected)
14          function startImpl (obj)
15              obj.PrevSamples = zeros (obj.InputLen-obj.OverlapLen,1);
16          end    114
17
18          function y = stepImpl (obj,u)
19              % Compute overlap-add output
20              L = obj.OverlapLen;
21              olapadd = [u(1:end-L,:) + obj.PrevSamples;...
22                         u(end-L+1:end,:)];
23              y = olapadd(1:L,:);   % First L rows
24              obj . PrevSamples = olapadd(L+1:end,:);
25          end
26      end
27  end
28
```

┌─ 626
                                           ┌──────────────┐
                                           │ matlab.system│
                                           │              │
                                           │      ▲       │
                                     628 ──┤      │       │── 622
                                           │  OverlapAdd  │
                                           ├──────────────┤
                                           │ +InputLen=256│
                                           │ +OverlapLen=90│
                                           │ -PrevSamples │
                                           ├──────────────┤
                                           │ #startImpl() │
                                           │ #stepImpl()  │
                                           └──────────────┘

620   624   632   634

Classes | Inheritance    OverlapAdd / stepImpl | Ln 13  Col 29 | OVR
613 ──►  616  Method: Protected        614                    618
608
                            FIG. 6

600
```

```
<?xml version="1.0"?>     902
<templateDesignPattern>
Template design pattern description    904
for System object base class.
<classdef>matlab.System</classdef>

Method definitions
<method>
    <interface>validateInputsImpl(obj, varargin)</interface>
    <interface>setupImpl (obj, varargin)</interface>
    <interface required=true>varargout = stepImpl (obj, varargin)</interface>
</method>  # ... other methods here

Sequence flow connections    910
<connection>
    <source>validateInputsImpl</source>
    <sink>setupImpl<sink>    912
</connection>    914
<connection>
    <source>setupImpl</source>
    <sink>stepImpl</sink>    916
</connection>
... other connections here
</templateDesignPattern>
```

906 {  (braces around Method definitions block)
908 {  (braces around Sequence flow connections block)

900 (figure label)

FIG. 9

… # CLASS CREATION ASSISTANT FOR TEXTUAL PROGRAMMING LANGUAGES

BRIEF DESCRIPTION OF THE DRAWINGS

The invention description below refers to the accompanying drawings, of which:

FIG. 6 is an illustration of a program editor window in accordance with an embodiment of the present invention;

FIG. 9 is a schematic illustration of design information specified with a textual graph notation.

DETAILED DESCRIPTION OF AN ILLUSTRATIVE EMBODIMENT

Figure 1:
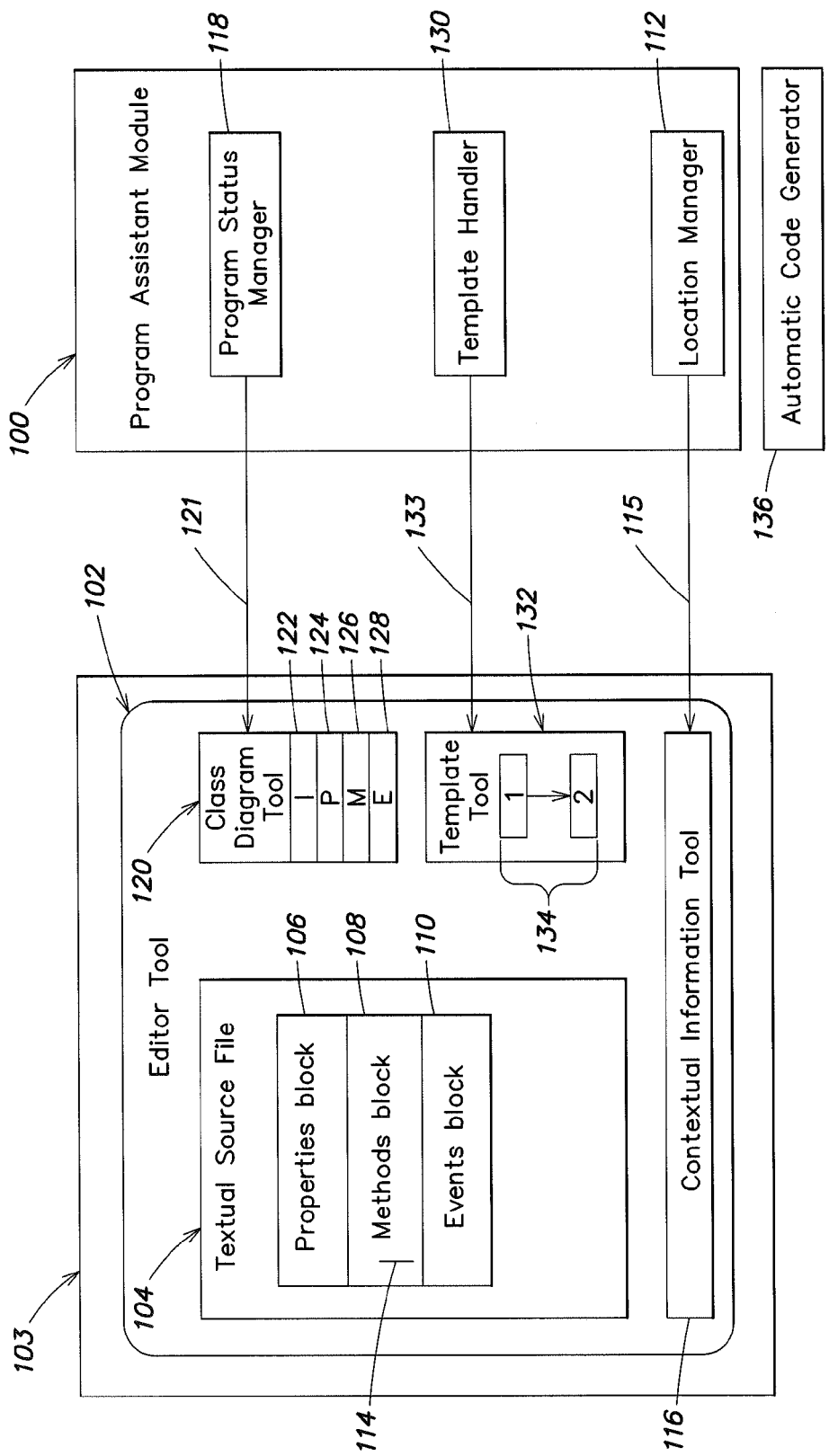
FIG. 1 is a schematic illustration of a program assistant module and an editor tool in accordance with an embodiment of the present invention.

Textual programming languages are often used by programmers and developers to create computer programs. A program includes a series of instructions written by the developer according to the syntax of the selected programming language. The developer may use an editor, such as a text editor, which presents a window within a graphical user interface for receiving instructions entered by the developer. The instructions, which constitute the source code of the program, may be saved as a source file. A compiler translates the source file into object code that may be executed.

A source program created by a developer may include a number of different sections or parts. These sections may be referred to as blocks of code, or simply blocks. A common type of programming language is an object oriented programming language. In an object-oriented programming environment, objects are created, and these objects interact with other objects in the environment. Objects are specific instances of a class, which describes a set of common characteristics. Objects have behaviors that are common to all objects of a class, and these behaviors are implemented through methods. Each object typically encapsulates data and operations. Objects interact with each other and with other entities of the object oriented environment via object interfaces such as function calls and events. Exemplary object oriented programming languages include C++, C#, the MATLAB programming language from The MathWorks, Inc. of Natick, Mass., and the Java programming language from Oracle Corp. of Redwood Shores, Calif., among others.

An object oriented program, for example a program created with the MATLAB programming language, may include a plurality of classes. Each class may be defined within a class definition (classdef) file. Each classdef file defines a class of the program, and may be used to construct an object of that class. Each classdef file may include a plurality of blocks. For example, a classdef file may include one or more properties blocks that contain property definitions, including names and initial values of properties, one or more methods blocks that contain definitions of class methods, and one or more events blocks that define events declared by the class. A given classdef file may define a subclass, which is a class that is derived from another class known as a base or super class, and that inherits properties, methods, and events from the base or super class.

System objects, also referred to as stream objects, are a particular type of class supported by the MATLAB programming language. System objects are described in commonly owned U.S. Patent Publication No. 2008/0127064 for a System and Method for Using Stream Objects to Perform Stream Processing in a Text-Based Computing Environment, which is hereby incorporated by reference in its entirety, and in the DSP System Toolbox User's Guide (September 2011) from The MathWorks, Inc., which is also hereby incorporated by reference in its entirety.

System objects may be used to represent dynamic and other systems. System objects define several methods, such as a Step method that processes data using an algorithm defined by the object. The processing associated with the Step method may include initializing needed resources, returning outputs, and updating object states. A 'getNumInputs' method for example may return the number of inputs expected by the Step method. System objects may need to call several predefined methods in a particular sequence to achieve proper execution. For example, the Step method may expect the following methods to be called in sequence: a 'ValidateNumInputs/Outputs' method, a 'CheckForSetup' method, a 'Release' method, a 'Setup' method, a 'ValidateProperties-Implementation' method, and a 'StepImplementation' method, among others.

A complex program, such as a complex classdef file, may include hundreds or even thousands of instructions, e.g., lines of code, including many blocks. Individual blocks, moreover, might themselves be quite large. Even using a large computer display, a developer will only be able to view a small portion of such a program at any given time. Furthermore, as the program is created and edited, the developer will often jump around to different sections, such as different blocks, of the program. As a result, a developer may not know exactly what portion of the program is currently being displayed in the editor. It also may be difficult for a programmer to remember which elements he or she has already created, or to know whether all of the required or recommended elements of a program, such as all of the necessary or preferred properties or methods of a given classdef file, have been defined.

Accordingly, a need exists to help users, such as developers, create and edit programs, including large, complex object oriented programs representing dynamic and other systems.

In an embodiment, a system and method assists developers in creating and editing computer programs, such as object oriented programs. The system may include a desktop manager, a program editor module, an assistant module, an automatic code generator, and a compiler or an interpreter. The desktop manager may generate a graphical user interface in the form of a desktop environment having a plurality of windows for presentation on a display. The program editor module may provide an editor tool as part of the desktop environment. A developer may open a document, such as a source file, or create a new document in the editor tool. The assistant module may include one or more handlers or managers configured to control one or more tools that form additional parts of the desktop environment. Specifically, the assistant module may control a contextual information tool, a class diagram tool, and a template tool. These tools may be presented in separate windows or panes, and may be integrated with the editor tool.

FIG. 1 is a highly schematic illustration of a program assistant module 100 interacting with an editor tool 102, which may be presented on a display device 103. The editor tool 102 may present at least a portion of textual source file 104 having a properties block 106, a methods block 108, and an events block 110.

Contextual Information Tool

A location manager 112 of the program assistant module 100 may determine the current location of a moveable graphical user interface element, such as an insertion point 114 within the source file 104, and present information about its location in a contextual information tool 116. A developer, using an input device, such as a pointing device, may move the insertion point 114 around the source file 104 opened in the editor tool 102. Specifically, the location manager 112 may determine which particular code block 106, 108, 110 of the source file 104 the insertion point 114 is currently located in. The location manager 112 may control the contextual information tool 116, as illustrated by arrow 115, so as to display information regarding the current location of the insertion point 114 to the developer. For example, if the developer moves the insertion point 114 to the methods block 108, the location manager 112 may direct the contextual information tool 116 to display the word 'Method' in the contextual information tool 116, thereby notifying the developer that the insertion point 114 is located in the methods code block. Furthermore, the location manager 112 may direct the contextual information tool 116 to present additional information, such as one or more attributes of the particular methods code block in which the insertion point is currently located. For example, if the insertion point 114 is in a methods code block whose access attribute is public, the location manager 112 may direct the contextual information tool 116 to display the terms "methods/public". Similarly, if the insertion point 114 is located in a private, sealed, or hidden methods code block, the location manager 112 may direct the contextual information tool 116 to display corresponding information. In addition, the name of the particular method in which the insertion point 114 is currently located may also be displayed.

Thereafter, if the developer moves the insertion point 114 to the properties block 106, the location manager 112 may update the contextual information tool 116 so that it displays the term 'Properties'. In addition, the location manager 112 may direct the contextual information tool 116 to present information regarding one or more attributes of the particular properties code block in which the insertion point 114 is currently located. For example, if the insertion point 114 is located in an area of the properties code block for "tunable" parameters, the location manager 112 may direct the contextual information tool 116 to display the terms "Properties/Tunable". As the developer moves the insertion point 114 around the source file 104, the location manager 112 may dynamically update the information presented in the contextual information tool 116. The location manager 112 may update the contextual information tool 116 instantaneously as perceived by the developer.

Class Diagram Tool

In a further embodiment, a program status manager 118 of the assistant module 100 may monitor the status of the class being defined in the editor tool 102, and may present information regarding the current state of the class in a class diagram tool 120. The class diagram tool 120 may be presented as a side bar of the editor tool 102, although other options, such as a separate window or pane, or a transparent graphical overlay on top of the editor tool 102, may be used. The class diagram tool 120, which may be controlled by the program status manager 118, as indicated by arrow 121, may include a plurality of information regions, such as an inheritance (I) region 122, a properties (P) region 124, a methods (M) region 126, and an events (E) region 128. The program status manager 118 may direct the class diagram tool 120 to display within the inheritance region 122 information regarding the base or super class from which the current class is inherited. In the properties region 124, the class diagram tool 120 may be directed to display information regarding the properties that have been defined so far for the class. For example, the class diagram tool 120 may display the names and initial values, if any, of the properties that have been defined.

As the developer defines new properties and assigns initial values, or edits existing properties, the program status manager 118 dynamically updates the information displayed in the properties region 124 of the class diagram tool 120 to include the names and initial values of these new properties, or to reflect the changes made to existing properties. For example, the editor module may notify the assistant module 100 of updates and changes entered in the editor tool 102, and the assistant module 100, through the program status manager 118, may update the class diagram tool 120 accordingly.

In the methods region 126, the program status manager 118 may direct the class diagram tool 120 to display information regarding the methods that have been defined so far for the class, such as the names of the methods. Similarly, in the events region 128, the program status manager 118 may direct the class diagram tool 120 to display information regarding the events that have been declared so far for the class, such as the names of the events.

In an embodiment, the information presented in the class diagram tool 120 may be edited by the developer, and the program status manager 118 in cooperation with the editor module may cause changes made to the information in the class diagram tool 120 to be implemented throughout the source file 104. Specifically, the program status manager 118 may notify the editor module of such edits or changes, and the editor module may modify the source file 104 to reflect these changes. For example, the developer may change the name or initial value of a property displayed in the property region 124 of the class diagram tool 120. In response, this same change may be implemented throughout the source file 104. That is, the information presented in the class diagram tool 120 is dynamic, i.e., editable, and is linked to the respective information in the source file 104. Similarly, changes made to the information presented in the methods and/or events regions 126, 128 of the class diagram tool 120 may be reflected immediately within the source file 104.

Template Tool

In a further embodiment, a template handler 130 of the assistant module 100 may obtain design information for a class being constructed in the editor tool 102, and may present this information in a template tool 132. For example, the creator of a base or super class may specify information, such as a list of preferred properties, methods and/or events, for subclasses that inherit from this base or super class. The creator may also specify a list of required properties, methods, and/or events, and a preferred or required sequence of methods and/or events. The design information may be stored in the base or super class itself, or in another location known to the assistant module 100, such as in one or more eXtensible Markup Language (XML) files.

The template handler 130 may access this information and control the template tool 132, as illustrated by arrow 133, so as to display at least a portion of this information to the developer. The template tool 132 may be a sidebar of the editor tool 102, or it may be incorporated into the class diagram tool 120, among other presentation options. If a base or super class identifies a number of preferred or required methods and a particular sequence in which the methods are to be called, the template handler 130 may direct the template tool 132 to present this information for example in the form of a sequence diagram 134. The preferred or required methods may include an Initialize method and a Start method, and the Initialize method may be called before the Start method. Other preferred or required methods may include Output and Update methods, and the Output method may called before the Update method. The template handler 130 may direct the template tool 132 to present a sequence of methods through a textual graph notation, or a graphical notation, such as a directed graph defined using the DOT language, based on the open source Graph Visualization Software (Graphviz) originally developed by AT&T Labs.

The assistant module 100 may also receive information from the editor module identifying which methods have been defined so far in the source file 104. The template handler 130 may update the information presented in the template tool 132 to indicate which of the preferred or required methods have yet to be defined in the source file 104. For example, the template handler 130 may use a graphical feature, such as a color, shading, etc., to indicate which methods presented in the template tool 132 have yet to be defined. The template handler 130 also may use another graphical feature, such as bold, the color yellow, etc., to indicate which methods are required methods for the class, and yet another graphical feature, such as the color red, to indicate which of the required methods have yet to be defined by the developer.

The creator may define multiple sets of preferred or required properties, methods and/or events for a base or super class. These sets may specify different sequences of methods and/or events. For example, a first set may be a Basic set and may include a minimum number of properties, methods and/or events. An Advanced set may include additional properties, methods and/or events. In an embodiment, the template tool 132 may present information regarding the particular set, e.g., Basic or Advanced, being displayed. The template tool 132 may include one or more user-selectable buttons that allow a developer to choose the particular set of properties, methods and/or events to be displayed in the template tool 132, e.g., Basic or Advanced.

The template handler 130 may additionally use a further graphical feature within the template tool 132 to provide contextual information regarding the current location of the insertion point 114 within the source file 104. For example, to the extent the insertion point 114 is located in one of the properties, methods, or events displayed in the template tool 132, the template handler 130 may apply the further graphical feature to that particular property, method, or event as presented in the template tool 132. In this way, contextual information may be provided to the developer through the template tool 132.

As the developer defines additional methods in the program file, the template handler 130 may update the information displayed in the template tool 132 to indicate that these methods have now been defined. In an embodiment, the information presented in the template tool 132 is dynamically updated in real time from the user's perspective as changes are made to the source file 104.

Automatic Code Generation

In an embodiment, an automatic code generator 136 may cooperate with the assistant module 100 to generate and insert code, such as one or more instructions, into the source file 104 automatically. Specifically, the template tool 132 may be configured for use by the developer in defining or editing properties, methods, and/or events. For example, if a developer selects a method presented in the template tool 132 that has yet to be defined in the source file 104, the automatic code generator 136 may cooperate with the editor module, to add one or more instructions regarding the selected method into the source file 104. The one or more instructions added to the source file 104 may define the selected method. The developer may select a desired method from the template tool 132 through user input, such as double-clicking the desired method with a mouse, dragging and dropping the desired method from the template tool 132 to the source file 104, etc. In an embodiment, the editor module adds the one or more instructions at the appropriate location in the source file 104. In addition, the program status manager 118 may respond by dynamically updating the method region 126 of the class diagram tool 120 to reflect that this method has now been defined in the source file 104.

Figure 2:
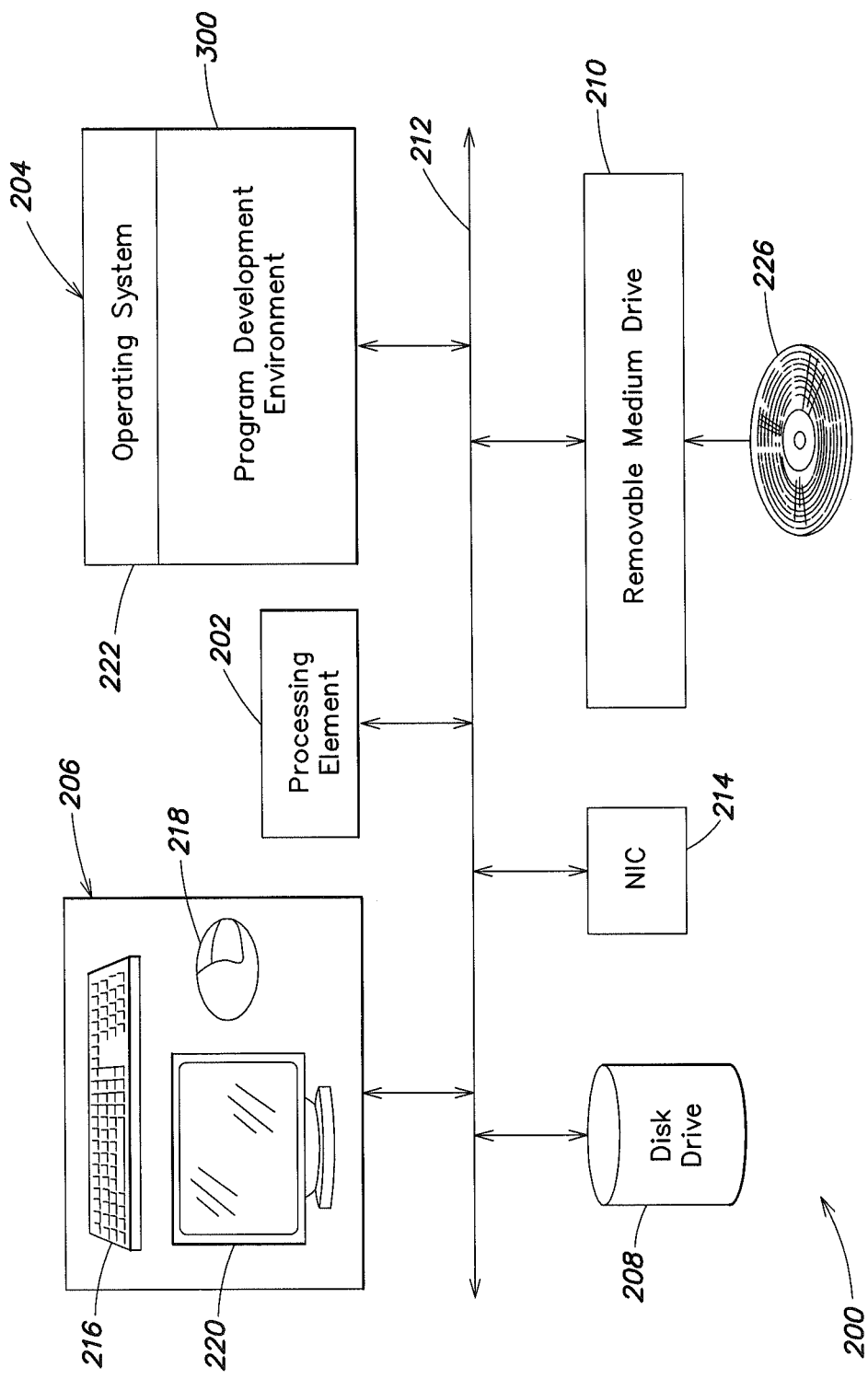
FIG. 2 is a schematic block diagram of a data processing system suitable for use with the present invention.

FIG. 2 is a schematic illustration of a computer or data processing system 200 for implementing and utilizing an embodiment of the invention. The computer system 200 includes one or more processing elements, such as a processing element 202, a main memory 204, user input/output (I/O) 206, a persistent data storage unit, such as a disk drive 208, and a removable medium drive 210 that are interconnected by a system bus 212. The computer system 200 may also include a communication unit, such as a network interface card (NIC) 214. The user I/O 206 may include a keyboard 216, a pointing device, such as a mouse 218, and a display 220. Other exemplary user I/O include voice control systems, touchpads, touchscreens, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 204, which may be configured as Random Access Memory (RAM), may store a plurality of libraries or modules, such as an operating system 222, and one or more applications that interface with the operating system 222, such as a program development environment 300.

The removable medium drive 210 may accept and read a computer readable medium 226, such as a CD, DVD, floppy disk, solid state drive, tape, flash memory or other non-transitory medium. The removable medium drive 210 may also write to the computer readable medium 226.

Suitable computer systems include personal computers (PCs), workstations, laptops, tablets, palm computers, smart phones, electronic readers, and other portable computing devices, etc. Nonetheless, those skilled in the art will understand that the computer system 200 of FIG. 2 is intended for illustrative purposes only, and that the present invention may be used with other computer systems, data processing systems, or computational devices. The present invention may also be used in a networked, e.g., client-server, computer architecture, or a public and/or private cloud computing arrangement.

Suitable operating systems 222 include the Windows series of operating systems from Microsoft Corp. of Redmond, Wash., the Linux operating system, the MAC OS® series of operating systems from Apple Inc. of Cupertino, Calif., and the UNIX® series of operating systems, among others. The operating system 222 may provide services or functions for other modules, such as allocating memory, organizing data according to a file system, prioritizing requests, etc. The operating system 222 may run on a virtual machine, which may be provided by the data processing system 200.

A user or developer, such as an engineer, scientist, programmer, etc., may utilize the keyboard 216, the mouse 218, and the display 220 to operate the program development environment 300. For example, the user may create a new program, or may open and revise an existing program, such as a text-based computer program. The text-based computer program may be stored as an object, a file, a project containing multiple objects or files, or some other data structure or structures in the main memory 204, the disk drive 208, and/or the medium 226.

The operating system 222 may provide a graphical user interface (GUI) through which a user may interact with one or more applications, such as the program development environment 300. The GUI may include several features, such as one or more moveable user interface elements. The one or more user interface elements may be moved about the display screen 220 in response to a user moving a pointing device, such as the mouse 218. Exemplary user interface elements include a pointer, a cursor, and an insertion point. To the extent the user interface element is a cursor, it may be in the shape of an arrow, a hand, etc., and may be used to perform operations, such as executing commands, e.g., by selecting a graphical button or icon, highlight text for editing operations, etc. In an embodiment, the user interface element is an insertion point.

The insertion point identifies a location within textual information at which new text will be inserted, or at which existing text will be deleted, e.g., in response to keyboard or mouse inputs. The insertion point may be in the shape of a blinking vertical line, and may also be moved about textual information presented on the display screen 220. The operating system 222 may provide several ways in which to move the insertion point to different locations within the displayed text. For example, the insertion point may be positioned by moving the cursor to a desired location, and operating a button on the pointing device, such as performing a left-click on the mouse 218. The insertion point also may be moved to a new location using keyboard inputs, such as the arrow keys, page up/down keys, etc.

The cursor may change its shape depending on the area of the screen over which it is displayed. For example, if the cursor is over a command button or icon, it may have the shape of a doubled-sided arrow, indicating that the cursor may be used to select the command button. If the cursor is over text, it may have the shape of an I-beam, indicating that the cursor may be used to position the insertion point.

In an embodiment, the program development environment 300 may be used to create programs according to a class based object oriented programming language. Suitable program development environments include the MATLAB® technical computing environment from The MathWorks, Inc. of Natick, Mass., the Octave language, distributed under the GNU Public License, the MathScript programming system from National Instruments Corp. of Austin, Tex., the Java programming language from Oracle Corp. of Redwood Shores, Calif., the Visual Basic and .NET Framework from Microsoft Corp., and the C, C++, C#, SystemC, and SmallTalk programming languages, among others.

Those skilled in the art will understand that the MATLAB® technical computing environment is a math-oriented, textual programming environment for digital signal processing (DSP) design, among other uses. The MATLAB environment provides a number of high-level features that facilitate algorithm development and exploration, such as dynamic typing, array-based operations, data type inferencing, sample time inferencing, and execution order inferencing, among others.

Figure 3:
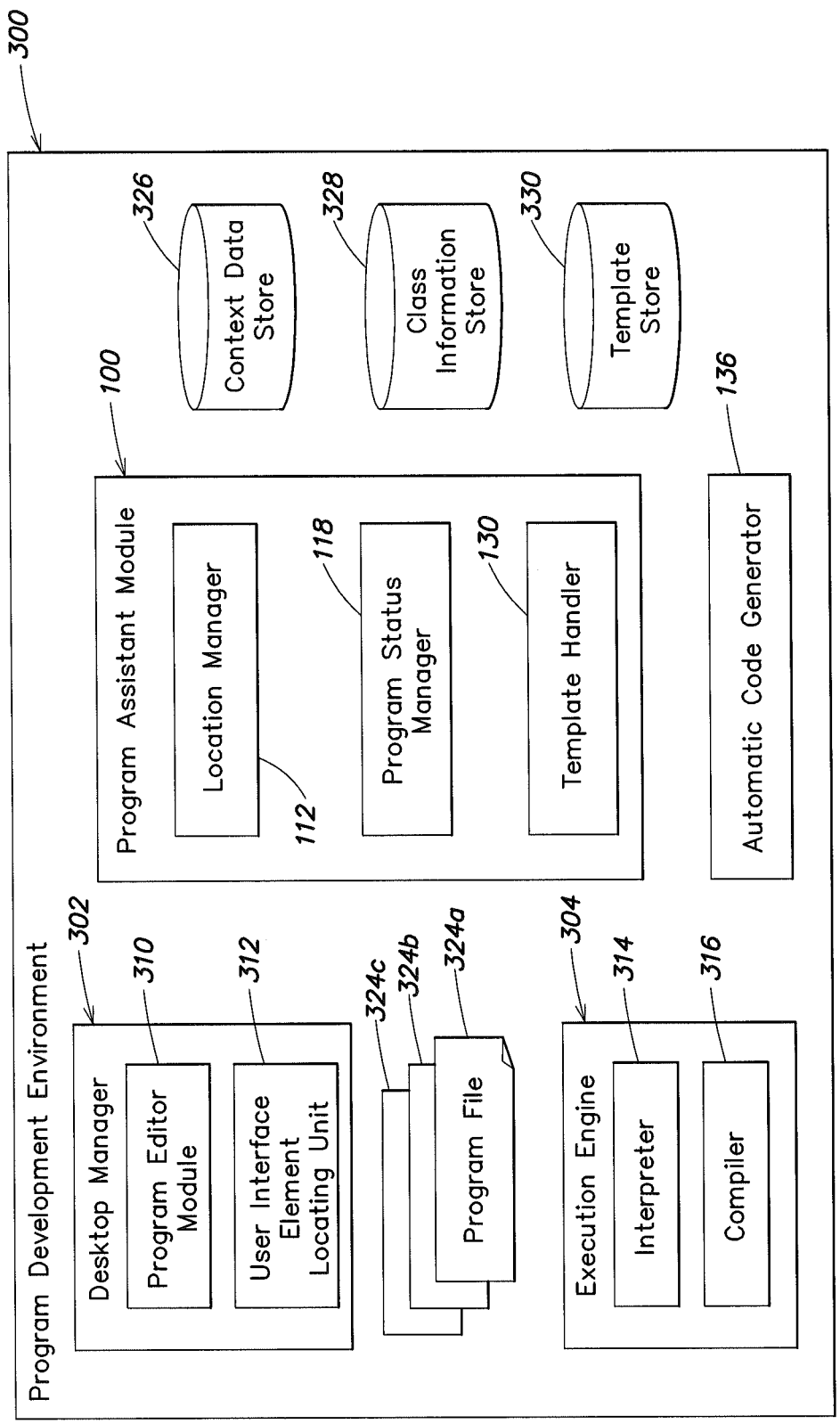
FIG. 3 is a partial function diagram of a program development environment in accordance with an embodiment of the present invention.

FIG. 3 is a partial block diagram of an embodiment of the program development environment 300. The environment 300 may include a desktop manager 302, an execution engine 304, the program assistant module 100, and the automatic code generator 136. The desktop manager 302 may include a program editor module 310, and a user interface (UI) element locating unit 312. The execution engine 304 may include an interpreter 314 and/or a compiler 316. The program assistant module 100 may include one or more components for controlling tools presented in an editor, such as the location manager 112, the program status manager 118, and the template handler 130. The program development environment 300 also may include or have access to one or more program files, such as program files 324a-c, a context data store 326, a class information store 328, and a template store 330.

The desktop manager 302, execution engine 304, program assistant module 100, and automatic code generator 136 may each comprise registers and/or combinational logic configured and arranged to produce sequential logic circuits. In an embodiment, the desktop manager 302, execution engine 304, program assistant module 100, and automatic code generator 136 may be implemented through one or more software modules or libraries containing program instructions pertaining to the methods described herein. The software modules may be stored on main memory 204 and/or on non-transitory computer readable media, such as computer readable medium 226, and executed by one or more processing elements, such as processing element 202. Other computer readable media may also be used to store and execute these program instructions. In alternative embodiments, various combinations of software and hardware, including firmware, may be utilized to implement the present invention.

The program files 324, context data store 326, class information store 328, and template store 330 may be implemented through files, tables, trees, or other data structures. They may be stored on main memory 204, persistent memory 208, and/or medium 226.

The program development environment 300 may include other modules or components, such as a debugger, an object constructor, a code verification tool, etc.

A program being created or edited by a user, such as an object-oriented program, may include one or more class definitions. A class definition may be contained in a distinct portion of code, such as class definition (classdef) file or block. In addition, a classdef file or block may contain one or more blocks or subblocks. In particular, a classdef file may include one or more of: a properties block, a methods block, an events block, and an enumeration block, among others. Furthermore, there may be separate blocks for each unique set of attributes. For example, a classdef file may include multiple properties, methods, and events blocks. A first properties block may have an access attribute set to public, and thus define properties to which access is unrestricted, e.g., other parts of the program such as other classes and methods, or other programs, may access these properties. A second properties block may have its access attribute set to protected, and thus define properties that may only be accessed by the code corresponding to the class in which the property is defined or by the code corresponding to those classes that derive from this class. A third properties block may have its access attribute set to private, and thus define properties to which access is restricted to the code for the class in which the property is defined. The classdef file also may include multiple methods blocks that correspond to methods whose access attribute is set to public, protected, and private, among others. The classdef file may further include multiple events blocks that correspond to events with different attribute settings.

The programming language may support other attributes besides access attributes for properties and methods, and a classdef file may include blocks that define properties and methods having such other attributes. Furthermore, depending on the language or languages supported by the program development environment 300, other or additional access attributes may be provided.

When completed by the user, the program file 324a may be compiled and executed, or it may be interpreted for example by execution engine 304. The program file 324a also may be included in a package. A package is a library of related objects. For example, a Digital Signal Processing (DSP) package may contain programs, e.g., classdef files, that create objects designed to perform DSP operations, such as discrete cosine transformations (DCTs), cross-correlations of signals, finding a maximum value of an input signal, etc. A Video and Image Processing package may contain classdef files that create objects designed to perform Video and Image Processing operations, and so on. A constructor may be used to construct an instance of an object from a classdef file, and a user or program may invoke or call one or more methods on an instantiated object.

As mentioned, a classdef file may inherit from a base or super class. For example, the classdef files of the DSP package may inherit from a DSP super class. The classdef files of the Video and Image Processing package may inherit from a Video and Image Processing super class. The DSP and Video and Image Processing super classes may themselves inherit from other base or super classes.

Figure 4:
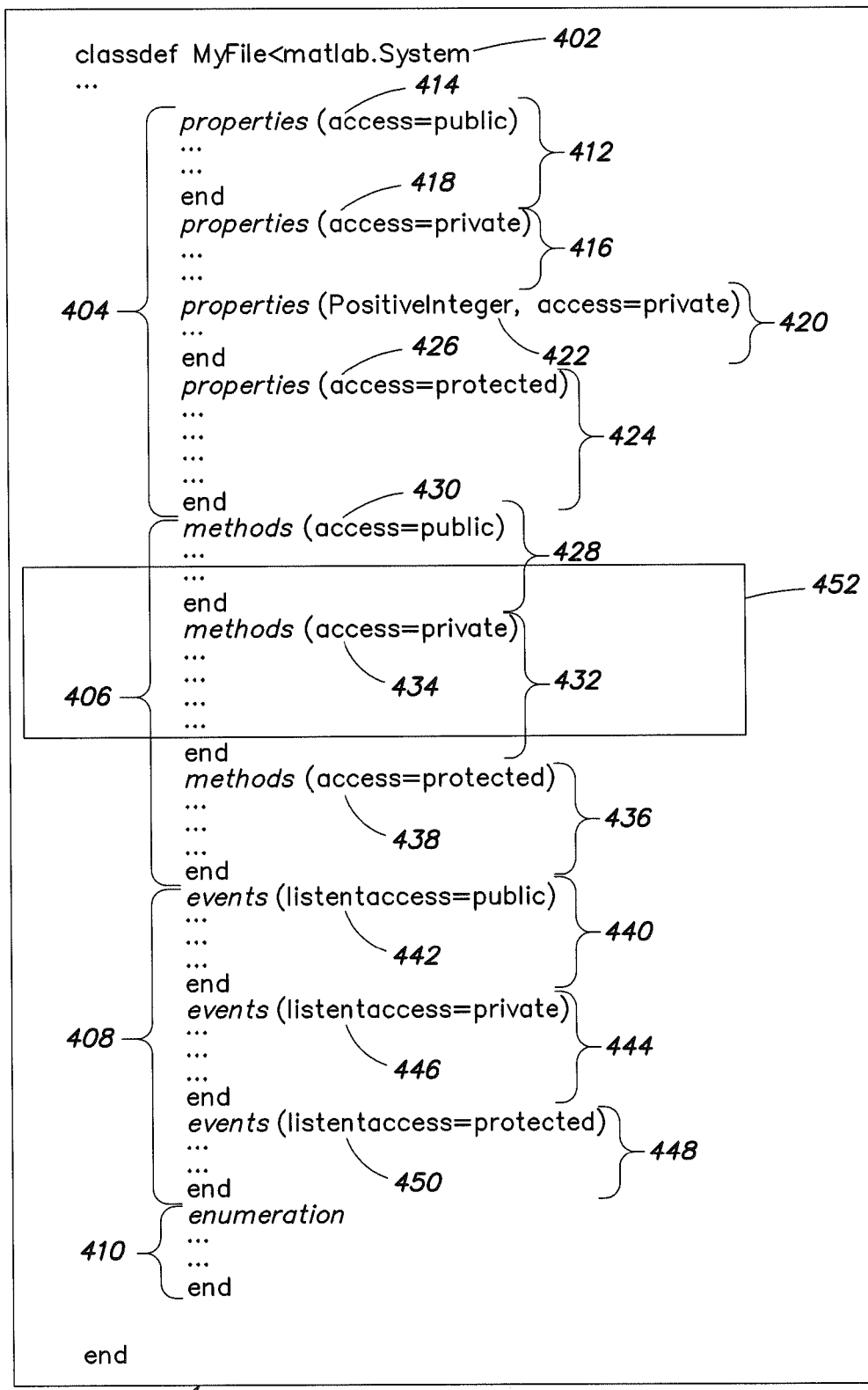
FIG. 4 is a schematic illustration of a program file.

FIG. 4 is a schematic illustration of a program file, such as the program file 324a. The program file 324a may be a class definition (classdef) file. The classdef file 324a may include a subclass entry or line 402 that subclasses the class from a base or super class. The classdef file 324a also may include a first region 404 containing one or more properties blocks, a second region 406 containing one or more methods blocks, a third region 408 containing one or more events blocks, and a fourth region 410 containing one or more enumeration blocks. The first region 404 may include a first properties block 412 that defines properties whose access attribute is public, as indicated by attribute setting entry 414, a second properties block 416 that defines properties whose access attribute is private, as indicated by attribute setting entry 418, a third properties block 420 that defines properties whose numeric attribute is Positive Integer and whose access attribute is protected, as indicated by attribute setting entry 422, and a fourth properties block 424 that defines properties whose access attribute is protected, as indicted by attribute setting entry 426.

A first methods block 428 defines methods whose access attribute is public, as indicated by attribute setting entry 430. A second methods block 432 defines methods whose access attribute is private, as indicated attribute setting entry 434. A third methods block 436 defines methods whose access attribute is protected, as indicated by attribute setting entry 438.

A first events block 440 defines events whose listen access attribute is public, as indicated by attribute setting entry 442. A second events block 444 defines events whose listen access attribute is private, as indicated attribute setting entry 446. A third events block 448 defines events whose listen access attribute is protected, as indicated by attribute setting entry 450.

The classdef file 324a and the blocks each contain one or more entries or lines of code, which are illustrated in the figure with ellipses ( . . . ). Some or all of the blocks may contain numerous, e.g., hundreds of, lines of code. Furthermore, a program file may contain multiple classdef blocks each with its own properties, methods, and events subblocks.

During program creation and editing, a user may jump among different blocks of the same or even of different classdef blocks. The user may use keyboard controls, such as page up and page down keys, arrow keys, and other keys or controls to navigate around a program file opened in an editor. Because of the large size of some program files, only a relatively small portion of the code may be shown at any given time within the editor tool presented on the display screen 220. For example, outline 452 may illustrate the amount of code from the program file 324a that may be viewed at any given time on the display screen 220. The portion presented within outline 452 may be smaller, possibly much smaller, than a single block. Because the user may move to different blocks or other portions of the program file 324a, it may be difficult for a user to know which particular portion or block is currently presented on the display 220, and thus which portion or block an insertion point or a cursor is currently located in. For example, the user may not know whether the insertion point or cursor is currently located in a first or second classdef block, or in the public or private properties blocks, etc.

As mentioned above, classdef files may be created for inclusion in a particular package. In order for such classes to operate as intended, classdef files created for inclusion in a given package may need to include one or more private methods, and may need to execute or perform those private methods in a particular order in response to a public method being called on an object constructed from that classdef file. For example, in response to a Setup method being called on an object, e.g., by a user or programmatically, the object may need to perform the following methods in the order listed:

validatePropertiesImpl—which may be used to define one or more operations or functions to validate interdependent or interrelated property values at the beginning of object initialization;

validateIntputsImpl—which may be used to define one or more operations or functions to validate inputs to the step method at the beginning of initialization, such as checking data types, complexity, cross-input validation, etc.;

setupImpl—which may be used to define one or more operations or functions that are executed the first time a Step method is called on an object; and resetImpl—which may be used define one or more state reset equations, such as resetting one or more states to initial values.

The above methods may be private methods.

Similarly, in response to a Step method being called on an object, the object may need to execute or perform the following methods in the order listed:

processTunedPropertiesImpl—which may be used to specify the actions to perform when a tunable property value changes;

startImpl or setupImpl—which may be used to specify one-time computations or allocations such as initialization of constants, precomputation of data tables, etc. It will only be called once at the start of execution, and not get called again until the object is released or re-instantiated;

stepImpl—which may be used to define the algorithm to be executed each time the step method is called on the object; and releaseImpl—which may be used to release resources used by the object.

Other preferred or required protected access methods may be defined for classes that inherit from a particular super class.

FIGS. 5A-D illustrate a flow diagram of a method in accordance with an embodiment of the invention. The program development environment 300 may receive inputs from a user constructing, editing, or opening a program, such as the program file 324a, as indicated at block 502. At least a portion of the program file may be presented in an editor tool presented on the display 220, as indicated at block 504.

Contextual Information Tool

A user interface element, such as a pointer, cursor or insertion point, may be moved about the program file 324a. As it is moved around, its position may be determined by the user interface element locating unit 312, as indicated at block 506. The locating unit 312 may obtain the interface element's position on the display 220, e.g., in display screen coordinates from the operating system 222. For example, the operating system 222 may define an interface element object that has a position property whose value may be obtained by the locating unit 312, e.g., by calling a get method on the interface element object. Information regarding the position or location of the interface element, as determined by the locating unit 312, may be provided to the location manager 112. Utilizing information received from the locating unit 312, the location manager 112 may determine where in the program file the interface element is currently located, as indicated at block 508.

Specifically, the location manager 112 may keep track of how the text of the program is organized, and how it is laid out on the display screen 220, including the particular blocks making up the classdef file, the order of the blocks, etc. For example, the program editor module 310 may sequentially number the lines of the program file, starting with 0 or 1. Furthermore, the location manager 112 may store the particular line numbers of the program file that correspond to various blocks at the context data store 326. For example, the location manager 112 may determine that lines 383 to 368 correspond to the private methods block 432 (FIG. 4), and may store this information at the context data store 326.

Based on the particular line numbers of the portion of the program that is displayed in the editor, and the information in the context data store 326, the location manager 112 may determine which block or blocks of the program are currently being displayed. Utilizing the location of the interface element on the screen 220 and the layout of the program, the location manager 112 may determine where in the program the interface element is currently located. The location manager 112 may display information concerning the current location of the interface element in a contextual information tool on the display 220, as indicated at block 510.

It should be understood that other techniques may be used by the location manager 112 to determine the current location of the interface element within the program file.

FIG. 6 is a schematic illustration of an editor 600 that may be created by the program editor module 310 of the desktop manager 302, and presented on the display 220. The editor 600 may be just one of several program development windows provided by the desktop manager 302. The user may open, move and re-size the editor 600 as desired. The editor 600 may include a plurality of elements, such as a menu bar 602 that includes a plurality of drop down menus, such as File, Edit, etc., each providing one or more commands. For example, using the File→New command, the user may create a new program file 324, such as a new classdef file in the editor 600. Using the File→Open command, the user may edit or revise an existing program file 324. The editor 600 also may include a toolbar 604 having a plurality of command buttons or icons that, if selected, perform an operation. In addition, the editor 600 may include an editing window or pane 606 in which at least a portion of the program file opened in the editor 600, e.g., program file 324a, is displayed. The program file may correspond to one or more classdef files, such as a classdef file for a class called 'OverlapAdd'. The OverlapAdd classdef file may include one or more properties blocks, one or more methods blocks, and one or more events blocks, among other blocks. The editor 600 also may include a status bar 608, which may be a horizontal area at the bottom of the editor 600.

In an embodiment, a single program file, such as a single classdef file, may be opened in the editor 600. The program editor module 310, however, may allow multiple editors 600 to be opened by the user, and each editor may present a different program file.

One or more moveable interface elements, such as a cursor 610 and/or the insertion point 114, may be provided with the editor 600. The cursor 610 may be displayed in the editor 600, and the insertion point 114 may be displayed within the editing window 606, among other areas. Depending on where in the editor 600 it is located, the cursor 610 may assume different formats, such as an arrow or an I-beam. The insertion point 114 may be in the form of a blinking vertical line. The portion of the program file presented in the editing window 606 may correspond to the outline 452 (FIG. 4).

The editor 600 also may include a contextual information tool 613. The contextual information tool 613 may include one or more display elements, such as a first element 614, a second element 616, and a third element 618. In an embodiment, the contextual information tool 613 may be located within the status bar 608. Nevertheless, those skilled in the art will understand that the tool 613 may be located in other areas or regions of the editor 600.

The location manager 112 utilizes and controls the contextual information tool 613 to present information concerning the current location of one or more of the moveable interface elements, such as the insertion point 114, to the user. Specifically, the location manager 112 may present information concerning the classdef file in which the insertion point 114 is currently located, such as the name of the classdef file, e.g., 'OverlapAdd', in the first element 614. The location manager 112 may present information concerning the particular block in which the insertion point 114 is currently located, such as whether the insertion point 114 is currently located in a properties or a methods block, in the second element 616. The location manager 112 may present the terms "property", "method", or "event", depending on the particular type of block in which the insertion point 114 is currently located. In an embodiment, the location manager 112 also may include information concerning one or more attributes of the particular block in which the insertion point 114 is currently located. For example, if the insertion point 114 is currently located in the methods block 446 (FIG. 4) whose access attribute is 'protected', the location manager 112 may include this information in the second element 616.

To the extent the insertion point 114 is currently located in that portion of a methods block defining a particular method, the location manager 112 may include information concerning the particular method, such as its name, e.g., 'startImpl', in the third element 618.

As the insertion point 114 is moved to a new location in the program file, the location manager 112 updates the information in the contextual information tool 613 to reflect the new location of the insertion point 114, as indicated at block 512. For example, suppose the insertion point 114 is moved from the methods block 436 (FIG. 4) to the properties block 416 whose access attribute is 'private', and within the properties block to a property named 'InputLen'. The location manager 112 may present 'OverlapAdd' in the first element 614 of the contextual information tool 613 as the insertion point 114 is still within this classdef block, may present 'properties (Access=private)' in the second element 616 of the contextual information tool 613, and may present 'InputLen' in the third element 618 of the contextual information tool 613. From the user's perspective, the location manager 112 may update the contextual information tool 613 instantaneously.

The location manager 112 may alternatively or additionally provide information concerning the current location of the cursor 610 or some other moveable user interface element within the portion of the program file presented in the editing window 606 in the contextual information tool 613. Specifically, to the extent the cursor 610 is somewhere in the editing window 606, the location manager 112 may direct the contextual information tool 613 to present information regarding the cursor's location.

Class Diagram Tool

Figure 5A:
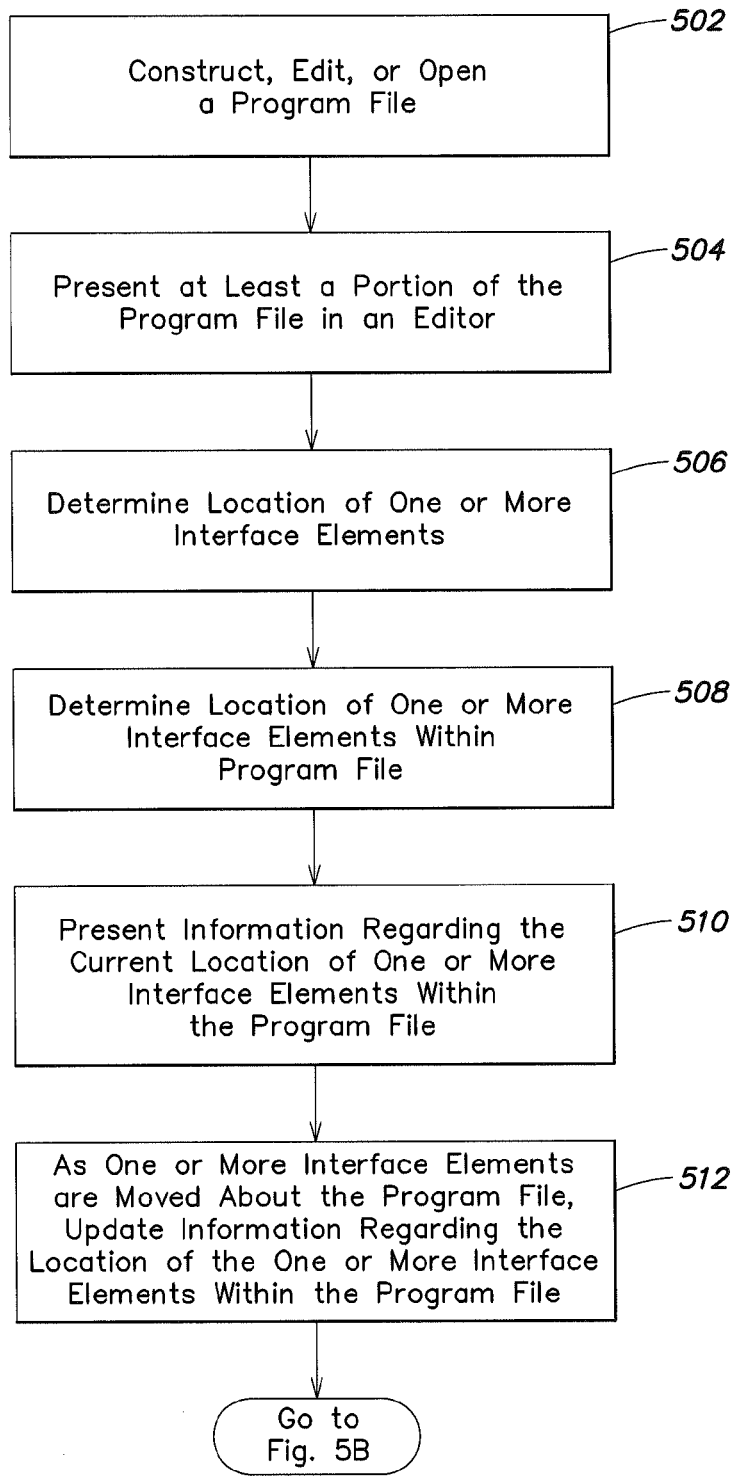
FIGS. 5A-5D illustrate a flow diagram of a method in accordance with an embodiment of the present invention.
Figure 5B:
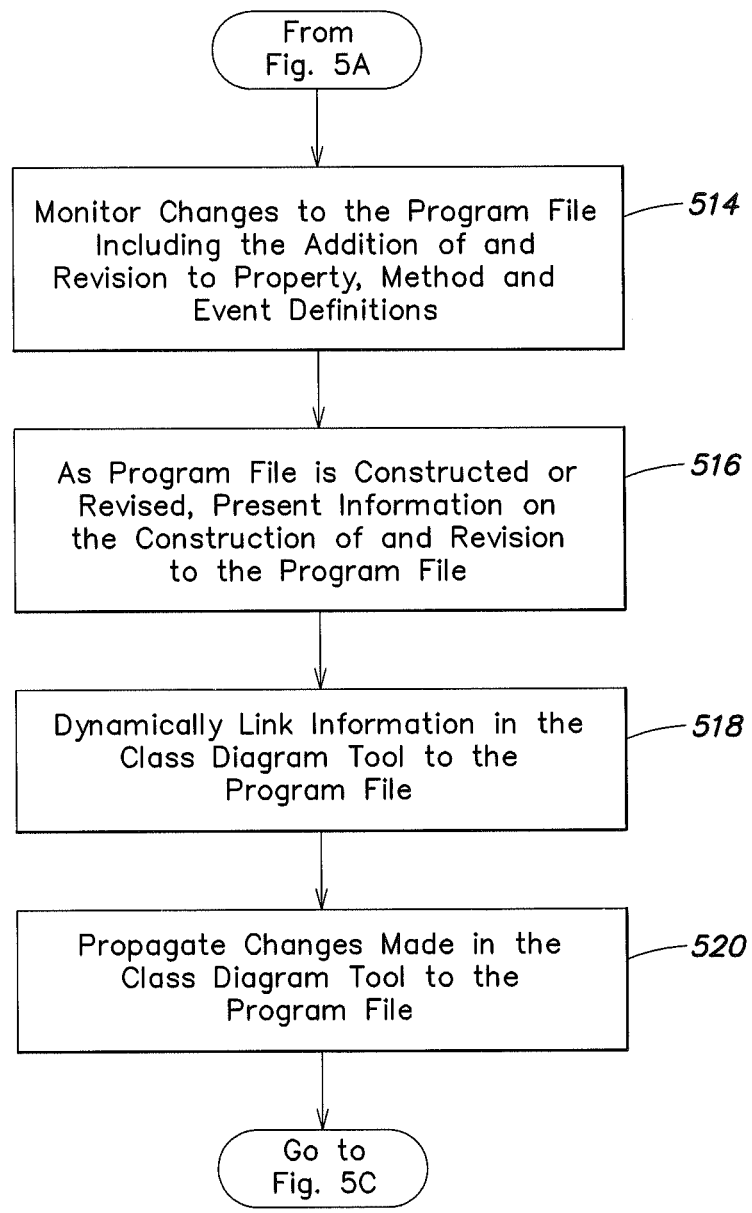

The program status manager 118 of the program assistant module 100 may monitor changes as they are made to the program, such as entries, e.g., lines of code, being added or deleted, initial values being entered or changed, property or method names being changed, etc., as indicated at block 514 (FIG. 5B). The program status manager 118 may present information regarding the program file 324, such as the current state of its development, in a class diagram tool in the editor 600, as indicated at block 516.

In an embodiment, the program status manager 118 may be configured to add a class diagram tool 620 (FIG. 6) in the editor 600. The program status manager 118 may provide information to the program editor tool 310, and this information may be presented in the class diagram tool 620. In an embodiment, the class diagram tool 620 includes the name of the classdef file, the names of properties that have been defined so far in the classdef file, the initial values, if any, of the defined properties, and the names of methods defined so far in the classdef file. In particular, the class diagram tool 620 may include a class icon 622 for the classdef file 324. The class icon 622 may be a rectangle or box. The class icon 622 may have a first compartment 624 that contains the name of the respective class, e.g., 'OverlapAdd'. To the extent the classdef file inherits from one or more other classes, such as a super class, a base class icon 626 may be included in the class diagram tool 620. The base class icon 626 may be visually linked to the class icon 622, e.g., by arrow 628, to illustrate the relationship between them. The base class icon 626 also may include a compartment 630 that contains the name of the super class, e.g., 'matlab.System'.

If the program file opened in the editor 600 includes more than one classdef file, a separate class icon within the class diagram tool 620 may be provided for each such classdef file.

In an embodiment, the class diagram tool 620 may be presented as a side bar to the editing window 606, for example to the right of the editing window 606. Nonetheless, other options, such as a separate window or pane, or a transparent graphical overlay on top of the editor tool, may be used.

The class icon 622 may include one or more regions, such as a properties region 632, and a methods region 634. The class icon 622 may contain other regions, such as an events region (not shown). In the events region, the class icon 622 may include the names of events defined in the editing window 606, and their initial values, if any. The program status manager 118 may provide separate regions within the class icon 622 for blocks having different attributes. For example, one region may list properties whose access attribute is private, while another region may list properties whose access attribute is public.

The program status manager 118 may include information regarding properties defined within the program file in the properties region 632. Similarly, the program status manager 118 may include information regarding methods defined within the program file in the methods region 634. The information displayed in the properties region 632 may include property name and initial value. The information displayed in the methods region 634 may include method name. As illustrated in the properties region 632, the user has defined three properties named: 'inputLen', 'OverlapLen', and 'PrevSamples'. The user also set the initial values of the 'InputLen' and the OverlapLen' properties to '256' and '90', respectively. As illustrated in the methods region 634, the user has defined two methods named: 'startImpl' and 'stepImpl'.

The program status manager 118 may update the information in the class icon 622 in response to user edits to the program file 324a. For example, if the user defines a new property within the editing window 606, the program status manager 118 adds the name of the new property to the properties region 632 of the class icon 622. Similarly, if the user defines a new method within the editing window 606, the program status manager 118 adds the name of the new method to the methods region 634 of the class icon 622. Similarly, if the user were to change the name of the 'InputLen' property to 'InLength', and to change its initial value from '256' to '1024' by editing the program file, the program status manager 118 may change the information displayed in the properties region 632 to:

+InLength=1024

If the user deletes a property or method, the program status manager 118 may remove the respective entry for that property or method from the respective region of the class icon 622.

In an embodiment, information contained in the class icon 622 is user-editable, and dynamically linked to the program file opened in the editor 600, as indicated at block 518. In addition, the program status manager 118 may automatically propagate changes to the information in the class icon 622 of the class diagram tool 620 to the program file 324a opened in the editor 600, as indicated at block 520. For example, if the user changes the initial value of the 'InputLen' property in the properties region 632 of the class icon 622 from '256' to '144', the program status manager 118 automatically changes the entry defining the 'InputLen' property in the program file so that its initial value is also changed to the new value, i.e., '144'. To edit information in the class icon 622, the user may place the insertion point 114 in the class icon 622. From the user's perspective, the propagation of edits between the class icon 622 and the program file 324 occurs instantaneously.

The program status manager 118 may store information, such as classdef file names, property names, initial property values, and method names in the class information store 328. The program status manager 118 also may store the locations of the properties and methods in the program file in the class information store 328 to facilitate updates to the program file 324 in response to user edits of the information in the class diagram tool 620.

Template Tool

Figure 5C:
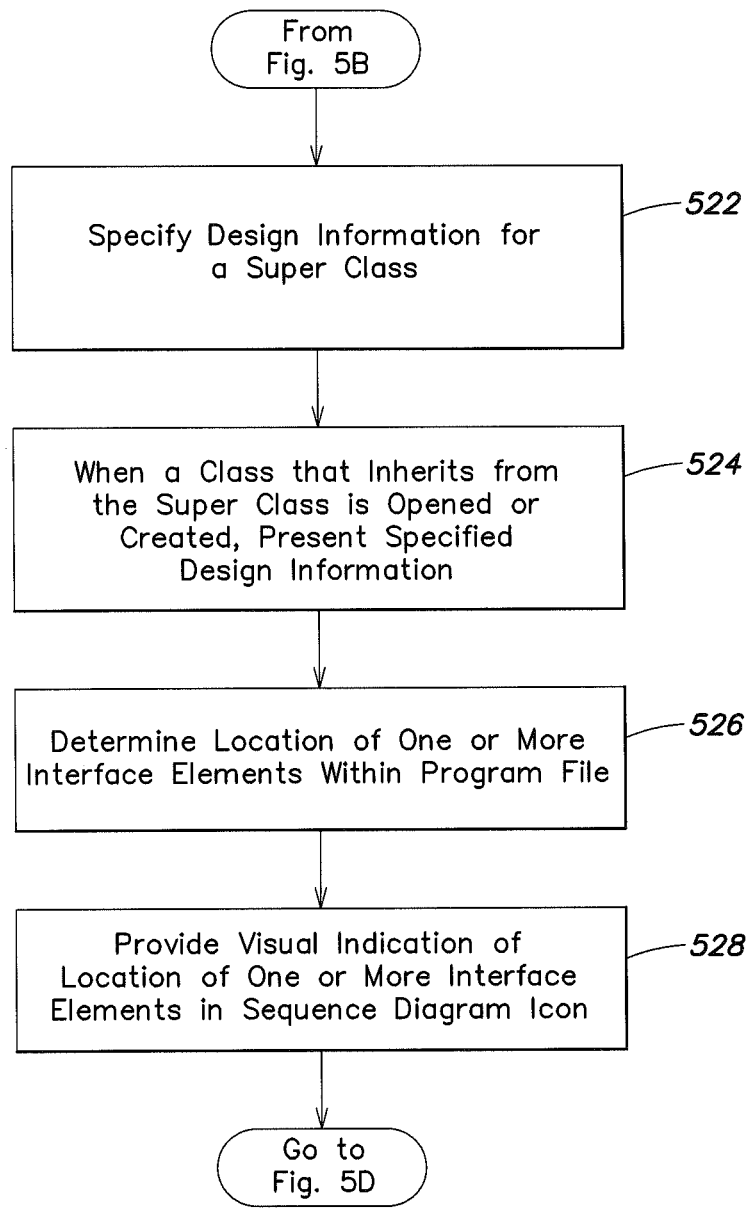

In a further embodiment, the creator of a base or super class, such as the 'matlab.System' super class may specify design information for use in constructing classes that inherit from the super class, as indicated at block 522 (FIG. 5C). The design information may be, or may include, one or more class constructions templates. A class construction template may include a list of properties and/or methods that should and/or must be included in classes, such as the 'OverlapAdd' object, and are typically inherited from the super class. A class construction template also may include a particular sequence, e.g., order, in which the listed methods are called, by the base class implementation and/or other supervisory logic, in classes that inherit from the super class. For example, a first class construction template may specify a series of methods that are called in response to a given method being called on objects constructed from the class. The series of methods called may be public, protected or private methods or a combination thereof. A second class construction template may specify a series of methods that are called in response to a given method being called.

The creator of the super class may include the one or more class construction templates in the base or super class itself. Alternatively or additionally, the creator may include one or more class construction templates in a separate object, for example a file, such as an eXtensible Markup Language (XML) file, that is associated with the base or super class. The template handler 130 may obtain the design information, such as the class construction templates, and copy or store them in the template store 330.

When a user opens or creates a new classdef file in the editor 600 that inherits from a super class, the template handler 130 may access one or more of the class construction templates for the super class, and present a template tool in the editor 600, as indicated at block 524. For example, the template handler 130 may access one or more of the templates from the template store 330, and present that information in a template tool in the editor 600.

To the extent the class construction template includes a list of methods and a sequence or order of those methods, the template handler 130 may include one or more sequence diagrams in the template tool.

Figure 7:
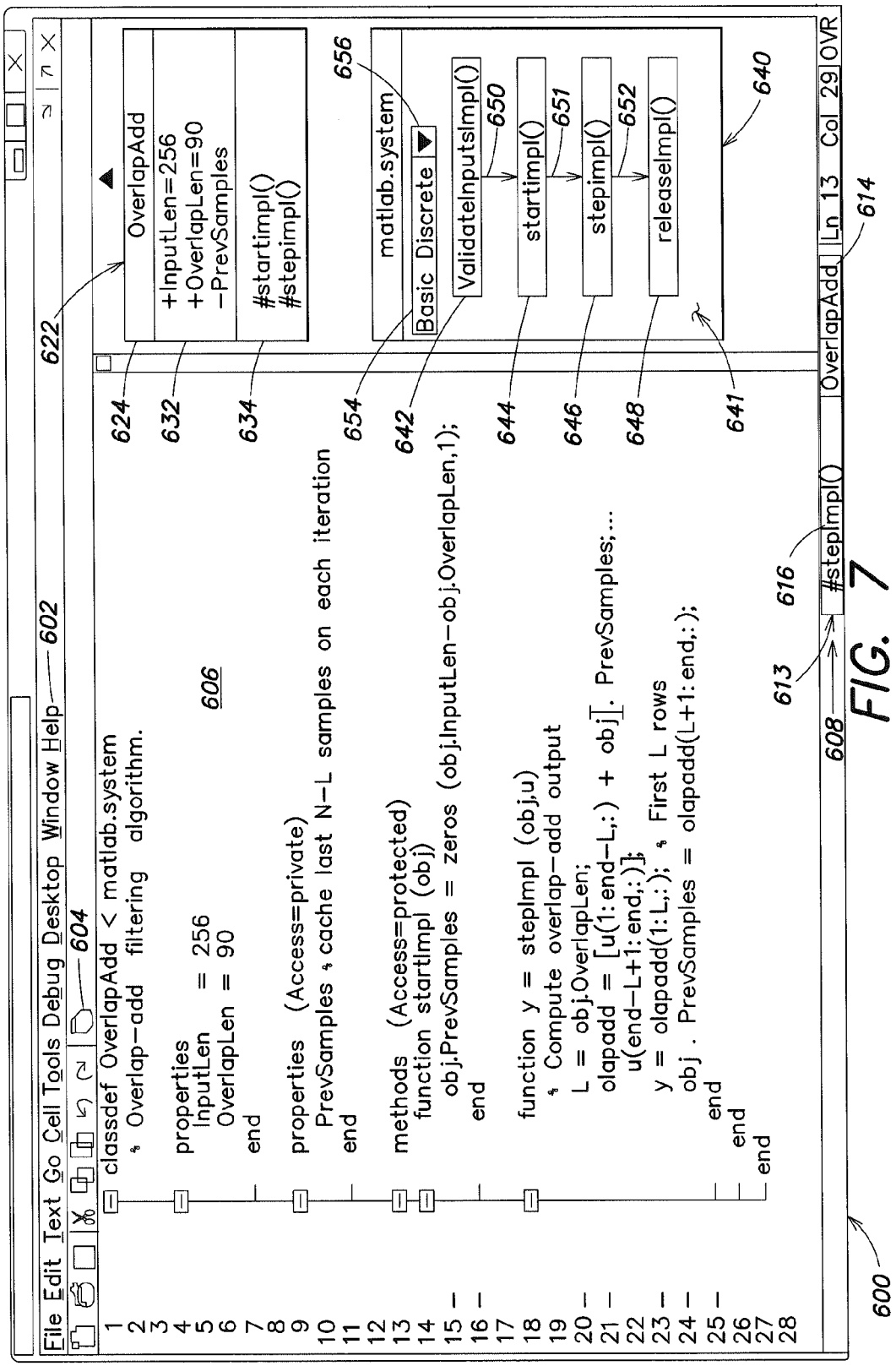
FIG. 7 is an illustration of a program editor window in accordance with another embodiment of the present invention.

FIG. 7 is a schematic illustration of a further embodiment of the editor 600. The editor 600 includes a template tool 640 having a sequence diagram 641. The sequence diagram 641 displays a sequence of methods as specified by the creator of the 'matlab.System' super class, from which the 'OverlapAdd' class inherits. The sequence diagram 641 may have a separate icon, such as a box, for each method from the class construction template, such as a 'validateInputsImpl( )' method box 642, a 'startImpl( )' method box 644, a 'stepImpl( )' method box 646, and a 'releaseImpl( )' method box 648. The boxes 642, 644, 646, and 648 may be vertically arranged relative to each other, and the sequence diagram 641 may include connections, such as arrows 650-552 between the boxes 642, 644, 646, and 648, to convey visually the order that the respective methods are called by the 'matlab.System' super class logic. That is, the sequence diagram 641 indicates that classes that inherit from the 'matlab.System' super class will have the following four methods called in order: 'validateInputsImpl( )', startImpl( )', 'stepImpl( )', and 'releaseImpl( )'.

Some methods may be called repeatedly by the base class logic, where the repetition may execute individual methods or subsets of specified template methods. Such repetitive executions may be indicated using arrows that suggest iteration in the visual display of the template sequence diagram.

If there are multiple class construction templates specified for the super class, the template tool 640 may include a graphical feature to select among the multiple class construction templates. For example, the template tool 640 may include a drop down menu, such as drop down menu 654 having a drop down button 656. Selection of the drop down button 656, e.g., by the user using a mouse click, may cause a list of the available class construction templates to be presented on the display 220. The user may select a desired one of the presented class construction templates, such as a Basic Discrete Time template, which may contain a minimum number of methods to implement a classdef file for use in a discrete time system. Other class construction templates may include an Advanced Discrete Time template, which may include other and/or additional methods beyond those included in the Basic template, a Basic Continuous Time template, which may include a plurality of methods to implement a classdef file for use in a continuous time system, and an Advanced Continuous Time template, among others.

In an embodiment, the template handler 130 may modify the appearance of one or more boxes 642-648 of the sequence diagram 640 to provide information to the user constructing or editing the classdef file opened in the editor 600.

First, the template handler 130 may determine the current location of the moveable interface element, such as the cursor 610 and/or the insertion point 114, as displayed in the editing window 606, as indicated at block 526. The template handler 130 may obtain the location of the cursor 610 and/or the insertion point 114 from the locating unit 312. The template handler 130 may provide an indication of the location of the cursor 610 and/or the insertion point 114 in the sequence diagram 641, as indicated at block 528. In particular, the template handler 130 may be notified by the locating unit 312 when the insertion point 114 is within the line or lines of code that define a method. The template handler 130 may alter the appearance of the box of the sequence diagram 641 that corresponds to the method in which the insertion point 114 is currently located. For example, if the insertion point 114 is in that portion of the program file that defines the 'startImpl( )' method, the template handler 130 may alter the appearance of box 644, which corresponds to that method, relative to the appearance of the other boxes 642, 646, 648.

Figure 8:
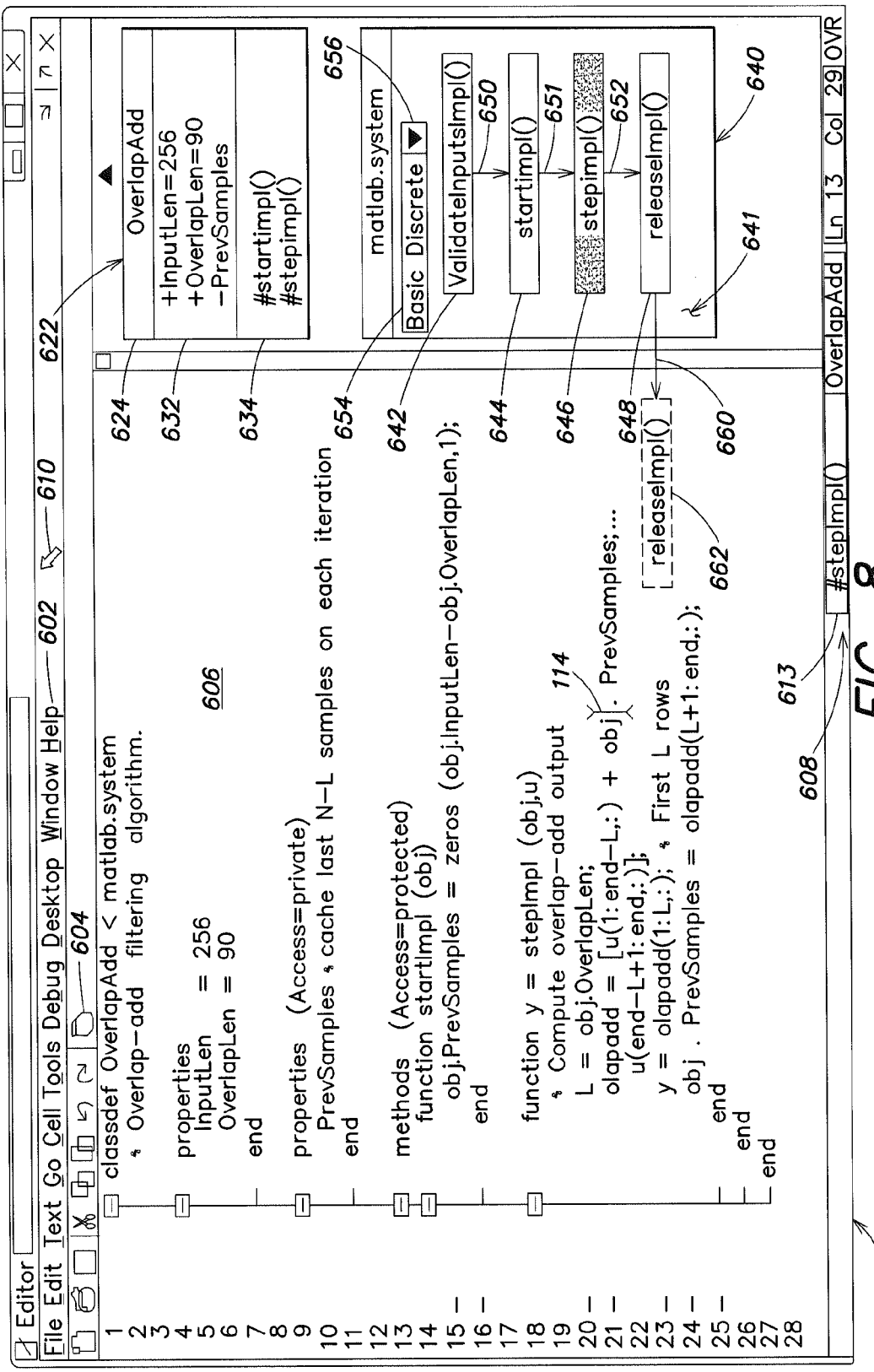
FIG. 8 is an illustration of a program editor window in accordance with another embodiment of the present invention.

FIG. 8 is a schematic illustration of a further embodiment of the editor 600. The insertion point 114 is located in the 'stepImpl( )' function within the editing window 606. The template handler 130 may alter the appearance of box 646 of the sequence diagram 641 relative to the other boxes 642, 644, and 648 to provide an indication that the insertion point 114 is located within this method. Here, the box 646 is shaded while the other boxes 642, 644, and 648 are not.

It should be understood that additional or other visual or graphical changes may be made to the box of the sequence diagram 641 corresponding to the method in which the insertion point is located, such as italics, reverse background and font colors, etc. By altering the appearance of the box associated with the method in which the insertion point 114 is currently located, the template handler 130 provides the user with a visual indication of which method is currently being defined or edited relative to the other methods of the class construction template.

Figure 5D:
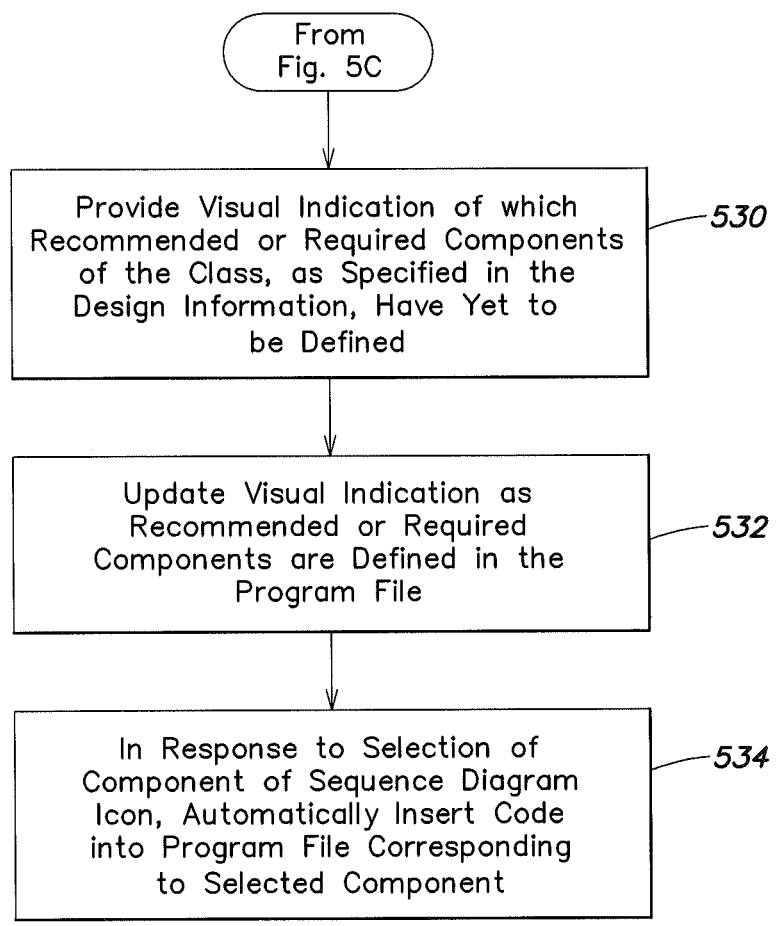

Second, the template handler 130 may use the sequence diagram 641 to present information regarding which methods have yet to be defined within the classdef file opened in the editor 600, as indicated at block 530 (FIG. 5D). In particular, the template handler 130 may apply a visual or graphical feature to those boxes that correspond to the methods that have yet to be defined by the user within the classdef file.

Exemplary graphical features may include bold, italics, a background color, e.g., yellow, a font, a font color, etc. Once the user defines a particular method within the editing window 606, the template handler 130 may change the visual or graphical feature of the box associated with the now defined method to indicate to the user that it is now defined, as indicated at block 532.

In an embodiment, as mentioned above, the creator of the base or super class may construct the sequence diagram 541 according to a textual graph notation. FIG. 9 is a schematic illustration of design information 900 specified by a developer using a textual graph notation. The design information 900 may be in an eXtensible Markup Language (XML) format. The design information 900 may include a first entry 902 that designates the information as design information, and a second entry 904 that identifies the base or super class to which the design information applies, e.g., the matlab.System class. The design information 900 may include a method definition section 906 that includes the definition of one or more preferred or required methods. The design information 900 also may include a sequence flow section 908 that specifies the sequence or order in which the methods defined in section 906 should or must be called. For example, entries 910, 912 specify that the 'validateInputsImpl' method is to be called before the 'setupImpl' method. Entries 914, 916 specify that the 'setupImpl' method is to be called before the 'stepImpl' method. As illustrated in the design information 900, the terms 'source' and 'sink' are used to specify the order in which methods are to be called.

It should be understood that other notations, besides or in addition to a textual graph notation, may be used to specify design information. For example, a graphical notation using nodes linked by edges may be used.

Automatic Code Generation and Insertion

In an embodiment, the sequence diagram 641 of the template tool 640 may be configured as an active editing tool. In particular, editing of the classdef file opened in the editor 600 may be accomplished through user operations on the sequence diagram 641, as indicated at block 534. For example, instead of entering text in the editing window 606 to define a given method, the user may select the box associated with the that method in the sequence diagram 641. A given method box may be selected by double clicking the box with the mouse 218, dragging the box from the sequence diagram 641 to the editing window 606, etc. In response to the selection of a given method box, the automatic code generator 136 may cause one or more textual entries to be added to the classdef file automatically. The textual entries may conform to the semantics and syntax of the programming language. The particular textual entries that are added to the program file in response to the selection of a method box of the sequence diagram 641 may be stored in the template store 330, and accessed by the automatic code generator 136.

With reference to FIG. 8, the user may select the 'releaseImpl( )' box 648 of the sequence diagram 641, and drag it into the editing window 606, as illustrated by arrow 660 and moveable box 662 having a dashed outline. The user may drag and drop the moveable box 662 to a desired location within the program file presented in the editing window 606. In response to dropping the moveable box 662 into the program file, the automatic code generator 136 may insert one or more entries or lines of code corresponding to the method into the editing window 606. For example, in response to dragging and dropping the 'releaseImpl( )' box 648, the automatic code generator 136 may insert one or more textual statements defining the 'releaseImpl( )' method. The user may then revise and/or add to these automatically inserted textual statements.

Figure 10:
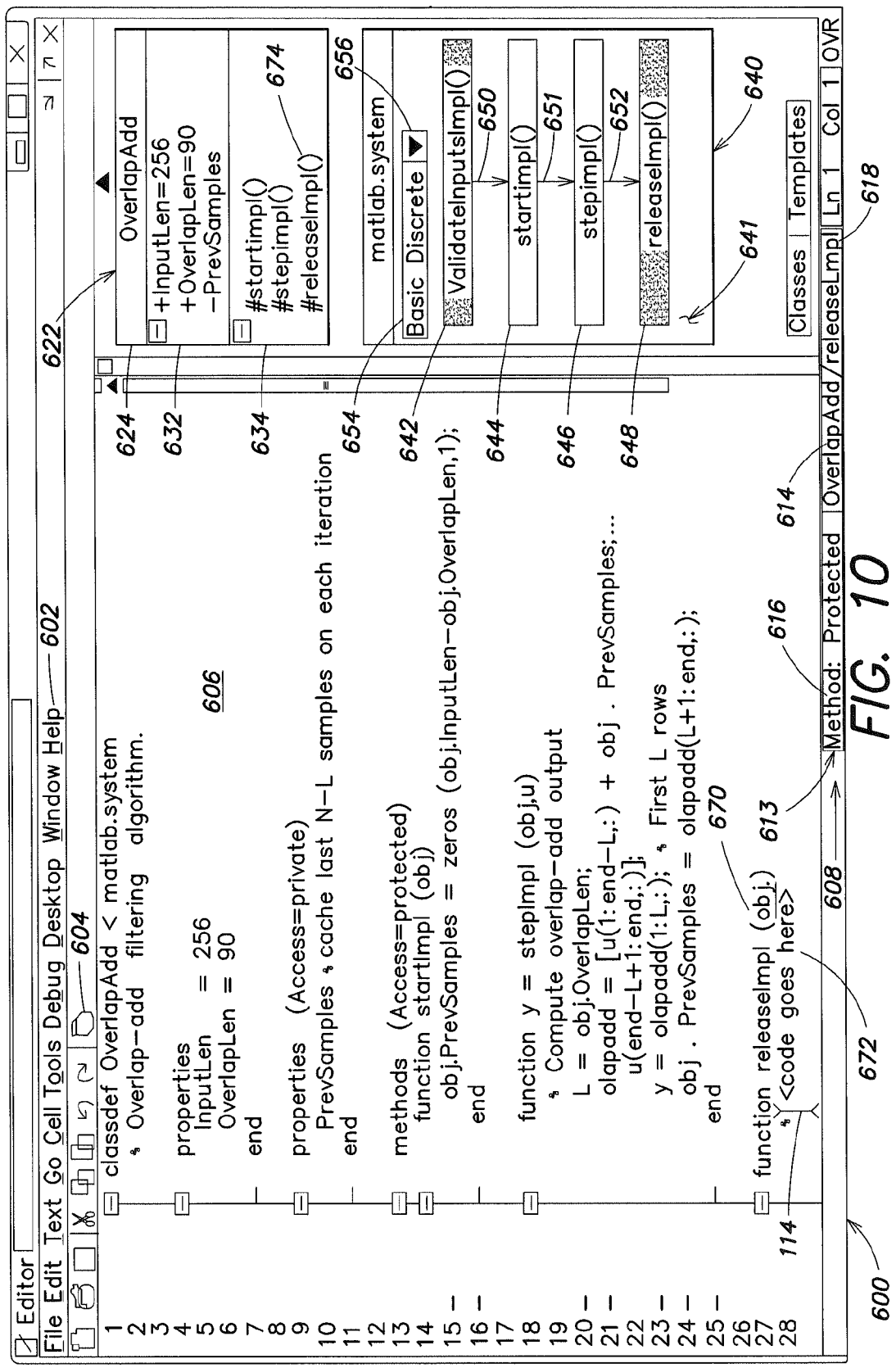
FIG. 10 is an illustration of a program editor window in accordance with another embodiment of the present invention.

FIG. 10 is a schematic illustration of a further embodiment of the editor 600. In particular, FIG. 10 shows the editor 600 after the user has dragged and dropped the 'releaseImpl( )' box 648 from the sequence diagram 641 into the editing window 606. As shown, the automatic code generator 136 has added new entries, e.g., new lines of code, 670, 672 into the program file. Entry 670 may start the definition of the 'releaseImpl( )' method according to the syntax of the programming language, and entry 672 may be a placeholder that is to be replaced with other code entered by the user.

Because the entries 670, 672 added by the automatic code generator 136 correspond to a new method added to the program file 324*a*, the program status manager 118 may update the methods region 634 of the class diagram tool 622 to reflect the addition of this new method, as indicated by entry 674. In addition, to the extent the addition of the new lines of code 670, 672 also places the insertion point 114 in the definition of this method, the location manager 112 may update the contextual information tool 613 to indicate that the insertion point 114 is currently located in the respective method, i.e., releaseImpl.

The location manager 112, the program status manager 118 and the template handler 130 may thus cooperate with each other to provide coordinated information to the user through the contextual information tool 613, the class diagram tool 622, and the template tool 640.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 200) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 200. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, while the invention has been described, at least in part, in connection with an object oriented programming language, it may be used with other programming languages. Therefore, it is the object of the appended claims to cover all such variations and modifications as come within the true spirit and scope of the invention.

What is claimed is:

1. A method comprising:
presenting a textual program in an editor of a user interface, the textual program defining a class that
inherits from a super class for which design information has been defined, and
includes at least one methods code block that defines one or more methods having names;
determining a current location of a moveable user interface element within the textual program, the current location of the user interface element being in the at least one methods code block;
presenting a contextual information tool in the user interface;
including in the contextual information tool information identifying the at least one methods code block in which the user interface element is currently located;
when the user interface element is moved to a new location within the textual program, dynamically updating the information included in the contextual information tool, where the updated information identifies the new location of the user interface element in the textual program;
presenting a class diagram tool in the user interface, the class diagram tool having a methods region that displays the names of the methods;
dynamically updating the methods region of the class diagram tool as a new method is defined in the textual program; and
presenting a template tool that displays the design information defined for the super class.

2. The method of claim 1, wherein the user interface element is user-controllable, and is pointer, a cursor, or an insertion point.

3. The method of claim 1, wherein the design information defined for the super class includes:
a plurality of required methods in a specified order, or
a plurality of preferred methods in a stated order.

4. The method of claim 3, wherein the specified order of the required methods or the stated order of the preferred methods relates to an execution order of a super class.

5. The method of claim 3 wherein the template tool presents the design information in the form of a sequence diagram having one or more graphical elements for the plurality of required or preferred methods.

6. The method of claim 1 further comprising:
receiving a selection of one of the plurality of required or preferred methods of the sequence diagram; and
automatically inserting into the textual program one or more textual instructions corresponding to the selected one of the plurality of required or preferred methods.

7. A non-transitory, computer-readable storage medium with an executable program stored thereon, where the program instructs a processor to:
present a source computer program in an editor tool of a user interface, the source computer program including at least one methods code block;
present a class diagram tool in the user interface, the class diagram tool having a methods region;
dynamically update the methods region of the class diagram tool when a new method is defined in the source computer program;
determine a current location of a moveable user interface element within the source computer program, the current location of the user interface element being in the at least one methods code block;
present a contextual information tool in the user interface;
include in the contextual information tool information identifying the at least one methods code block in which the user interface element is currently located; and
when the user interface element is moved to a new location within the source computer program, dynamically update the information included in the contextual information tool, where the updated information identifies the new location of the user interface element in the source computer program.

8. The non-transitory, computer-readable storage medium of claim 7, wherein the user interface element is user-controllable, and is a pointer, a cursor, or an insertion point.

9. The non-transitory, computer-readable storage medium of claim 7, wherein the program further instructs the processor to:
include in the contextual information tool information identifying one or more attributes of the at least one methods code block in which the user interface element is currently located.

10. The non-transitory, computer-readable storage medium of claim 7, wherein
the at least one methods code block of the source computer program includes textual statements defining a plurality of methods, each method having a name,
the user interface element is currently located in the textual statements corresponding to a first method, and
the information included in the contextual information tool includes the name of the first method.

11. The non-transitory, computer-readable storage medium of claim 7, wherein the source computer program has a form and the form is a file or a document.

12. A non-transitory, computer-readable storage medium with an executable program stored thereon, where the program instructs a processor to:
present a source computer program in an editor tool of a user interface, the source computer program including at least one properties code block;
present a class diagram tool in the user interface, the class diagram tool having a properties region;
dynamically update the properties region of the class diagram tool when a new property is defined in the source computer program;
determine a current location of a moveable user interface element within the source computer program, the current location of the user interface element being in the at least one properties code block;
present a contextual information tool in the user interface;
include in the contextual information tool information identifying the at least one properties code block in which the user interface element is currently located; and
when the user interface element is moved to a new location within the source computer program, dynamically update the information included in the contextual information tool, where the updated information identifies the new location of the user interface element in the source computer program.

13. The non-transitory, computer-readable storage medium of claim 12, wherein the user interface element is user-controllable, and is a pointer, a cursor, or an insertion point.

14. A non-transitory, computer-readable storage medium with an executable program stored thereon, where the program instructs a processor to:
- present a source computer program in an editor tool of a user interface, the source computer program including:
  - at least one methods code block that defines one or more methods,
- each of the one or more methods having a name;
- present a class diagram tool in the user interface;
- include in the class diagram tool a methods region that displays the name of the one or more methods; and
- dynamically update information displayed in the methods region of the class diagram tool as a new method is defined within the source computer program.

15. The non-transitory, computer-readable storage medium of claim 14, wherein
- the source computer program further includes at least one properties code block that defines one or more properties, each of the one or more properties having a name and an initial value, and the program further instructs the processor to:
- include in the class diagram tool a properties region that displays the name and the initial value of the one or more properties; and
- dynamically update information displayed in the properties region as a new property is defined within the source computer program.

16. The non-transitory, computer-readable storage medium of claim 15, wherein the program further instructs the processor to:
- receive a change to information in the properties region or the methods region of the class diagram tool; and
- in response to the received change, dynamically update the source computer program based on to the received change.

17. The non-transitory, computer-readable storage medium of claim 16, wherein the source computer program is dynamically updated to conform to the received change.

18. A non-transitory, computer-readable storage medium with an executable program stored thereon, where the program instructs a processor to:
- receive a source computer program that defines a class, the class inherits from a super class, the super class having a plurality of preferred or required methods;
- present a template tool, the template tool displaying the plurality of preferred or required methods of the super class;
- identify one or more of the preferred or required methods that is not presently defined within source computer program;
- identify, on the template tool utilizing a graphical feature, the one or more preferred or required methods not presently defined;
- receive a selection of one of the preferred or required methods displayed in the template tool;
- automatically generate one or more instructions defining the selected preferred or required method; and
- insert the one or more automatically generated instructions into the source computer program.

19. The non-transitory, computer-readable storage medium of claim 18, wherein the template tool includes a visual depiction of an order of execution of the plurality of preferred or required methods of the super class.

20. The non-transitory, computer-readable storage medium of claim 18, wherein
the super class has a plurality of method sets, each method set defining a plurality of preferred or required methods, and
the program further instructs the processor to:
receive a selection of one of the method sets; and
in response to receiving the selection, present through the template tool the preferred or required methods of the selected one of the method sets.

21. An apparatus comprising:
an editor tool executed by a first processor, the editor tool configured to present a source computer program in a user interface, the source computer program including at least one methods code block that defines one or more methods, each of the one or more methods having a name;
an assistant module executed by the first or a second processor, the assistant module configured to:
present a class diagram tool in the user interface, the class diagram tool having a methods region that displays the name of the one or more methods, and dynamically update information displayed in the methods region of the class diagram tool as a new method is defined within the source computer program.

22. The apparatus of claim 21 wherein the source computer program further includes at least one properties code block that defines one or more properties, each of the one or more properties having a name and an initial value, and the assistant module is further configured to:
include in the class diagram tool a properties region that displays the name and the initial value of the one or more properties; and
dynamically update information displayed in the properties region as a new property is defined within the source computer program.

23. An apparatus comprising:
means for receiving a source computer program that defines a class, the class inherits from a super class, the super class having a plurality of preferred or required methods;
means for presenting a template tool in a program editor, the template tool displaying the plurality of preferred or required methods of the super class;
means for identifying one or more of the preferred or required methods that is not presently defined within source computer program,
means for identifying, on the template tool utilizing a graphical feature, the one or more preferred or required methods not presently defined;
means for receiving a selection of one of the preferred or required methods displayed in the template tool;
means for automatically generating one or more instructions defining the selected preferred or required method; and
means for inserting the one or more automatically generated instructions into the source computer program.

24. A non-transitory, computer-readable storage medium with an executable program stored thereon, where the program instructs a processor to:
present a textual program in an editor of a user interface, the textual program defining a class that inherits from a super class for which design information has been defined, and includes at least one methods code block that defines one or more methods having names;
determine a current location of a moveable user interface element within the textual program, the current location of the user interface element being in the at least one methods code block;

present a contextual information tool in the user interface;
include in the contextual information tool information identifying the at least one methods code block in which the user interface element is currently located;
when the user interface element is moved to a new location within the textual program, dynamically update the information included in the contextual information tool, where the updated information identifies the new location of the user interface element in the textual program;
present a class diagram tool in the user interface, the class diagram tool having a methods region that displays the names of the methods;
dynamically update the methods region of the class diagram tool as a new method is defined in the textual program; and
present a template tool that displays the design information defined for the super class.

25. The non-transitory, computer-readable storage medium of claim 24, wherein the design information defined for the super class includes:
a plurality of required methods in a specified order, or
a plurality of preferred methods in a stated order.

26. The non-transitory, computer-readable storage medium of claim 25, wherein the specified order of the required methods or the stated order of the preferred methods relates to an execution order of a super class.

27. The non-transitory, computer-readable storage medium of claim 25 wherein the template tool presents the design information in the form of a sequence diagram having one or more graphical elements for the plurality of required or preferred methods.

28. The non-transitory, computer-readable storage medium of claim 24 wherein the executable program further instructs the processor to:
receive a selection of one of the plurality of required or preferred methods of the sequence diagram; and
automatically insert into the textual program one or more textual instructions corresponding to the selected one of the plurality of required or preferred methods.

29. A method comprising:
presenting a source computer program in an editor tool of a user interface, the source computer program including at least one methods code block;
presenting a class diagram tool in the user interface, the class diagram tool having a methods region;
dynamically updating, by a processor, the methods region of the class diagram tool when a new method is defined in the source computer program;
determining a current location of a moveable user interface element within the source computer program, the current location of the user interface element being in the at least one methods code block;
presenting a contextual information tool in the user interface;
including in the contextual information tool information identifying the at least one methods code block in which the user interface element is currently located; and
when the user interface element is moved to a new location within the source computer program, dynamically updating, by the processor, the information included in the contextual information tool, where the updated information identifies the new location of the user interface element in the source computer program.

30. The method of claim 29, wherein the user interface element is user-controllable, and is a pointer, a cursor, or an insertion point.

31. The method of claim 29 further comprising:
including in the contextual information tool information identifying one or more attributes of the at least one methods code block in which the user interface element is currently located.

32. The method of claim 29, wherein
the at least one methods code block of the source computer program includes textual statements defining a plurality of methods, each method having a name,
the user interface element is currently located in the textual statements corresponding to a first method, and
the information included in the contextual information tool includes the name of the first method.

33. A method comprising:
presenting a source computer program in an editor tool of a user interface, the source computer program including at least one properties code block;
presenting a class diagram tool in the user interface, the class diagram tool having a properties region;
dynamically updating, by a processor, the properties region of the class diagram tool when a new property is defined in the source computer program;
determining a current location of a moveable user interface element within the source computer program, the current location of the user interface element being in the at least one properties code block;
presenting a contextual information tool in the user interface;
including in the contextual information tool information identifying the at least one properties code block in which the user interface element is currently located; and
when the user interface element is moved to a new location within the source computer program, dynamically updating, by the processor, the information included in the contextual information tool, where the updated information identifies the new location of the user interface element in the source computer program.

34. The method of claim 33, wherein the user interface element is user-controllable, and is a pointer, a cursor, or an insertion point.

35. A method comprising:
presenting a source computer program in an editor tool of a user interface, the source computer program including:
at least one methods code block that defines one or more methods, each of the one or more methods having a name;
presenting a class diagram tool in the user interface;
including in the class diagram tool a methods region that displays the name of the one or more methods; and
dynamically updating, by a processor, information displayed in the methods region of the class diagram tool as a new method is defined within the source computer program.

36. The method of claim 35, wherein
the source computer program further includes at least one properties code block that defines one or more properties, each of the one or more properties having a name and an initial value, the method further comprising:
including in the class diagram tool a properties region that displays the name and the initial value of the one or more properties; and
dynamically updating information displayed in the properties region as a new property is defined within the source computer program.

37. The method of claim 36 further comprising:
receiving a change to information in the properties or methods regions of the class diagram tool; and
in response to the received change, dynamically updating the source computer program based on to the received change.

38. The method of claim 37, wherein the source computer program is dynamically updated to conform to the received change.

39. A method comprising:
accessing, from a memory, a source computer program that defines a class, the class inherits from a super class, the super class having a plurality of preferred or required methods;
presenting a template tool, the template tool displaying the plurality of preferred or required methods of the super class;
identifying, by a processor, one or more of the preferred or required methods that is not presently defined within source computer program;
identifying, on the template tool utilizing a graphical feature, the one or more preferred or required methods not presently defined;
receiving a selection of one of the preferred or required methods displayed in the template tool;
automatically generating, by the processor, one or more instructions defining the selected preferred or required method; and
inserting the one or more automatically generated instructions into the source computer program.

40. The method of claim 39, wherein the template tool includes a visual depiction of an order of execution of the plurality of preferred or required methods of the super class.

41. The method of claim 39, wherein
the super class has a plurality of method sets, each method set defining a plurality of preferred or required methods, the method further comprising:
receiving a selection of one of the method sets; and
in response to receiving the selection, presenting through the template tool the preferred or required methods of the selected one of the method sets.

* * * * *

UNITED STATES PATENT AND TRADEMARK OFFICE
CERTIFICATE OF CORRECTION

PATENT NO. : 9,170,783 B1  Page 1 of 1
APPLICATION NO. : 13/327263
DATED : October 27, 2015
INVENTOR(S) : Donald P. Orofino, II It is certified that error appears in the above-identified patent and that said Letters Patent is hereby corrected as shown below:

In the Claims:
Claim 2, Col. 19, line 38 should read:
ment is user-controllable, and is a pointer, a cursor, or an inser- Signed and Sealed this
Twenty-sixth Day of April, 2016

Michelle K. Lee
*Director of the United States Patent and Trademark Office*